(12) United States Patent
Miyagishima et al.

(10) Patent No.: US 10,151,964 B2
(45) Date of Patent: Dec. 11, 2018

(54) OCULAR LENS AND IMAGING APPARATUS

(71) Applicant: FUJIFILM Corporation, Tokyo (JP)

(72) Inventors: Shunsuke Miyagishima, Saitama (JP);
Hiroki Saito, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 17 days.

(21) Appl. No.: 15/654,090

(22) Filed: Jul. 19, 2017

(65) Prior Publication Data
US 2018/0052383 A1 Feb. 22, 2018

(30) Foreign Application Priority Data

Aug. 19, 2016 (JP) ................... 2016-161204

(51) Int. Cl.
*G02B 9/12* (2006.01)
*G03B 13/06* (2006.01)
*G03B 13/16* (2006.01)
*G03B 17/20* (2006.01)
*H04N 5/232* (2006.01)

(52) U.S. Cl.
CPC ............. *G03B 13/06* (2013.01); *G02B 9/12* (2013.01); *G03B 13/16* (2013.01); *G03B 17/20* (2013.01); *H04N 5/23216* (2013.01); *H04N 5/23293* (2013.01)

(58) Field of Classification Search
CPC .................... H04N 5/23216; G02B 9/12
USPC .......................................... 348/202
See application file for complete search history.

(56) References Cited

U.S. PATENT DOCUMENTS

| 9,678,328 B2 | 6/2017 | Saito | |
| 2013/0271849 A1* | 10/2013 | Hori | G02B 15/14 359/687 |
| 2014/0285901 A1* | 9/2014 | Noda | G02B 15/177 359/680 |
| 2015/0103411 A1 | 4/2015 | Katagata | |
| 2015/0362720 A1 | 12/2015 | Saito | |

FOREIGN PATENT DOCUMENTS

| JP | 2015-075713 A | 4/2015 |
| JP | 2016-001209 A | 1/2016 |

* cited by examiner

*Primary Examiner* — Jefferey F Harold
*Assistant Examiner* — Justin B Sanders
(74) *Attorney, Agent, or Firm* — Studebaker & Brackett PC

(57) ABSTRACT

An ocular lens consists of a positive first lens group, a positive or negative second lens group, and a positive third lens group, in order from an observation object side. The first lens group consists of a positive meniscus lens with a convex surface toward an eye-point side. The second lens group includes a negative lens and a positive lens, and the number of lenses constituting the second lens group is three or less. The third lens group consists of a positive meniscus lens with a convex surface toward the eye-point side. The following conditional expression relating to a focal length of the whole system and a distance on an optical axis from a lens surface closest to the observation object side to a lens surface closest to the eye-point side is satisfied: $0.8 < f/TL < 1.1$.

15 Claims, 7 Drawing Sheets

EXAMPLE 1

OCULAR LENS AND IMAGING APPARATUS

CROSS-REFERENCE TO RELATED APPLICATIONS

The present application claims priority under 35 U.S.C. § 119 to Japanese Patent Application No. 2016-161204, filed on Aug. 19, 2016. The above application is hereby expressly incorporated by reference, in its entirety, into the present application.

BACKGROUND OF THE INVENTION

1. Field of the Invention

The present invention relates to an ocular lens and an imaging apparatus, and more specifically relates to an ocular lens suitable for magnification observation of an image displayed on an image display device, and an imaging apparatus having this ocular lens mounted thereon.

2. Description of the Related Art

Hitherto, ocular lenses for magnifying an image displayed on an image display device such as a liquid crystal display device and observing the image with the naked eye have been used in a viewfinder of an imaging apparatus such as a digital camera. There has been a demand for such an ocular lens to be small in size and to be high in imaging performance. In order to respond to such a demand, JP2016-001209A proposes an ocular lens constituted by four lenses in which a positive lens, a negative lens, a positive lens, and a positive lens are disposed in order from an observation object side. In addition, a technique disclosed in JP2015-075713A has been known as a similar ocular lens constituted by four lenses.

SUMMARY OF THE INVENTION

In order for a viewfinder to facilitate observation, a long distance from an ocular lens to the position of an observer's pupil, as it is called, a high eye-point is required. In addition, an ocular lens having a wide field of view is also required. However, it has not been easy to achieve the magnification of the field of view in a state of being set to have a high eye-point. The ocular lens disclosed in JP2016-001209A is required to further magnify an apparent field of view. The ocular lens disclosed in JP2015-075713A is required to attain a higher eye-point.

The present invention has been contrived in view of such circumstances, and an object thereof is to provide an ocular lens having a high eye-point, a wide apparent field of view, and satisfactory optical performance, and an imaging apparatus including this ocular lens.

According to the present invention, there is provided an ocular lens consisting of, in order from an observation object side to an eye-point side: a first lens group having a positive refractive power; a second lens group having a positive or negative refractive power; and a third lens group having a positive refractive power, wherein the first lens group consists of one meniscus lens having a positive refractive power with a convex surface toward the eye-point side, the second lens group includes at least one negative lens and at least one positive lens, the number of lenses constituting the second lens group is three or less, the third lens group consists of one meniscus lens having a positive refractive power with a convex surface toward the eye-point side, and the following Conditional Expression (1) is satisfied, $$0.8 < f/TL < 1.1 \tag{1}$$

where f is a focal length of the whole system, and TL is a distance on an optical axis from a surface on the observation object side of the meniscus lens of the first lens group to a surface on the eye-point side of the meniscus lens of the third lens group.

In the ocular lens of the present invention, it is preferable to satisfy at least one of the following Conditional Expressions (2), (3), (4), (5), (6), (1-1), (2-1), (3-1), (4-1), (5-1), or (6-1), $$0.78 < TGL/TL < 0.97 \tag{2}$$

$$0.65 < (R1f - R1r)/(R1f + R1r) < 1 \tag{3}$$

$$0.01 < (R3f - R3r)/(R3f + R3r) < 0.3 \tag{4}$$

$$1.75 < Npave < 2 \tag{5}$$

$$0.01 < Nmax - Nmin < 0.35 \tag{6}$$

$$0.9 < f/TL < 1 \tag{1-1}$$

$$0.8 < TGL/TL < 0.95 \tag{2-1}$$

$$0.7 < (R1f - R1r)/(R1f + R1r) < 0.95 \tag{3-1}$$

$$0.05 < (R3f - R3r)/(R3f + R3r) < 0.25 \tag{4-1}$$

$$1.8 < Npave < 1.95 \tag{5-1}$$

$$0.05 < Nmax - Nmin < 0.3 \tag{6-1}$$

where TGL is a total sum of central thicknesses of lenses of the whole system,

TL is a distance on an optical axis from a surface on the observation object side of the meniscus lens of the first lens group to a surface on the eye-point side of the meniscus lens of the third lens group, R1f is a paraxial radius of curvature of a surface on the observation object side of the meniscus lens of the first lens group, R1r is a paraxial radius of curvature of a surface on the eye-point side of the meniscus lens of the first lens group, R3f is a paraxial radius of curvature of a surface on the observation object side of the meniscus lens of the third lens group, R3r is a paraxial radius of curvature of a surface on the eye-point side of the meniscus lens of the third lens group, Npave is an average value of refractive indices in a d line of positive lenses of the whole system, Nmax is a maximum value of refractive indices in the d line of the lens of the whole system, Nmin is a minimum value of refractive indices in the d line of lenses of the whole system, and f is a focal length of the whole system.

In the ocular lens of the present invention, the second lens group may be configured to consist of three lenses, or the second lens group may be configured to consist of two lenses.

According to the present invention, there is provided an imaging apparatus including the ocular lens of the present invention.

Meanwhile, the term "consist of ~" is intended to be substantial, and optical elements other than a lens such as a lens having substantially no power, a stop, cover glass, or a filter, a lens flange, a lens barrel, and the like may be included in addition to the components exemplified herein.

Meanwhile, the term "lens group" is not necessarily constituted by a plurality of lenses, but may be constituted by only one lens. The term "~ lens group having a positive refractive power" means that the lens group has a positive refractive power as a whole. The same is true of the term "~lens group having a negative refractive power". The sign of the refractive power of the lens group, the sign of the refractive power of the lens, and the shape of the lens are assumed to be those in a paraxial region in a case where an aspherical surface is included. The sign of the paraxial radius of curvature is set to be positive with respect to a surface shape with a convex surface toward the object side, and is set to be negative with respect to a surface shape with the convex surface toward the eye-point side.

Meanwhile, the number of lenses described above is the number of lenses serving as components. For example, the number of lenses in a cemented lens having a plurality of single lenses different from each other in material cemented to each other is indicated by the number of single lenses constituting this cemented lens. However, a compound aspherical lens (lens in which a spherical lens and an aspherical film formed on the spherical lens are formed integrally with each other to function as one aspherical lens as a whole) is not regarded as a cemented lens, and is assumed to be handled as one lens. In addition, all the conditional expressions are based on the d line (wavelength of 587.6 nm).

According to the present invention, in a lens system configured as three groups of positive, positive and positive lens or positive, negative and positive lens in order from the observation object side, since the configuration of each lens group is set specifically and suitably, and satisfies predetermined conditional expressions, it is possible to provide an ocular lens having a high eye-point, a wide apparent field of view, and satisfactory optical performance, and an imaging apparatus including this ocular lens.

DESCRIPTION OF THE PREFERRED EMBODIMENTS

Figure 1:
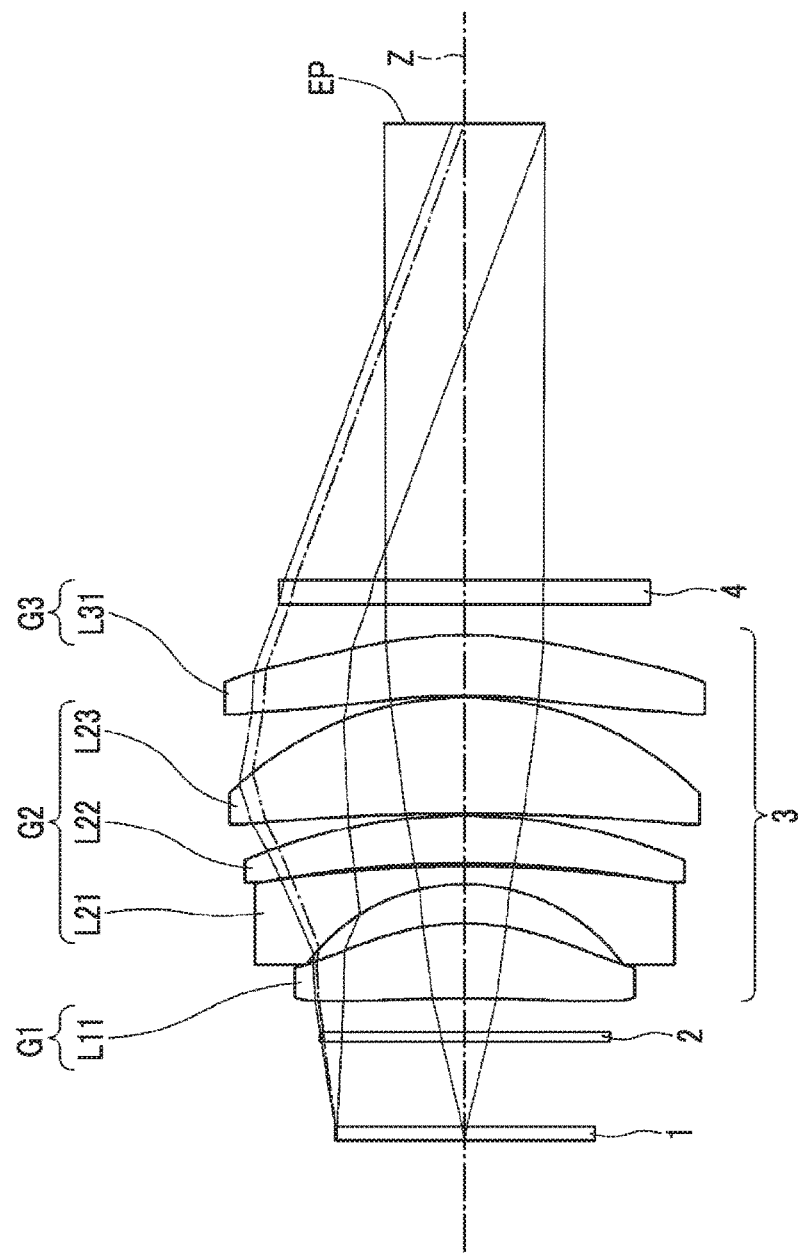
FIG. 1 is a cross-sectional view illustrating a configuration and an optical path of an ocular lens of Example 1 of the present invention.
Figure 2:
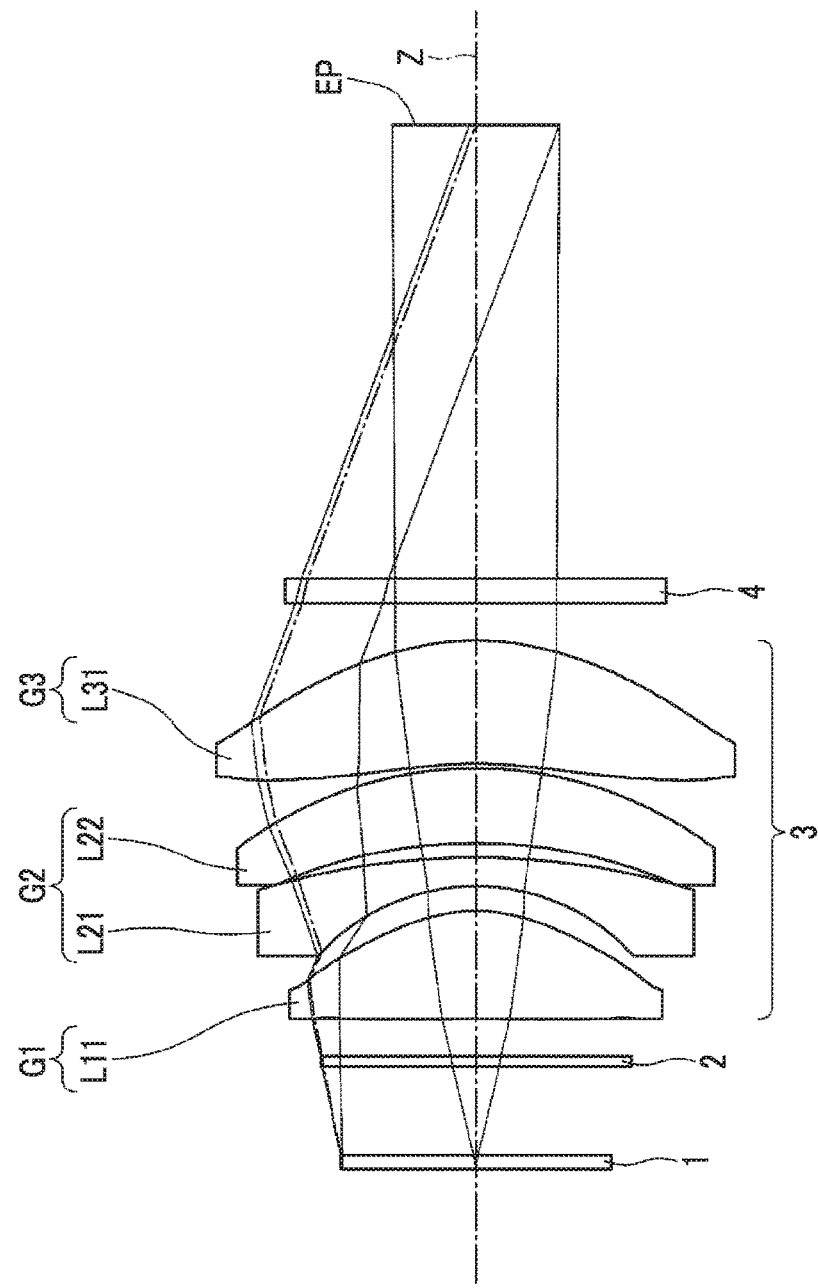
FIG. 2 is a cross-sectional view illustrating a configuration and an optical path of an ocular lens of Example 2 of the present invention.
Figure 3:
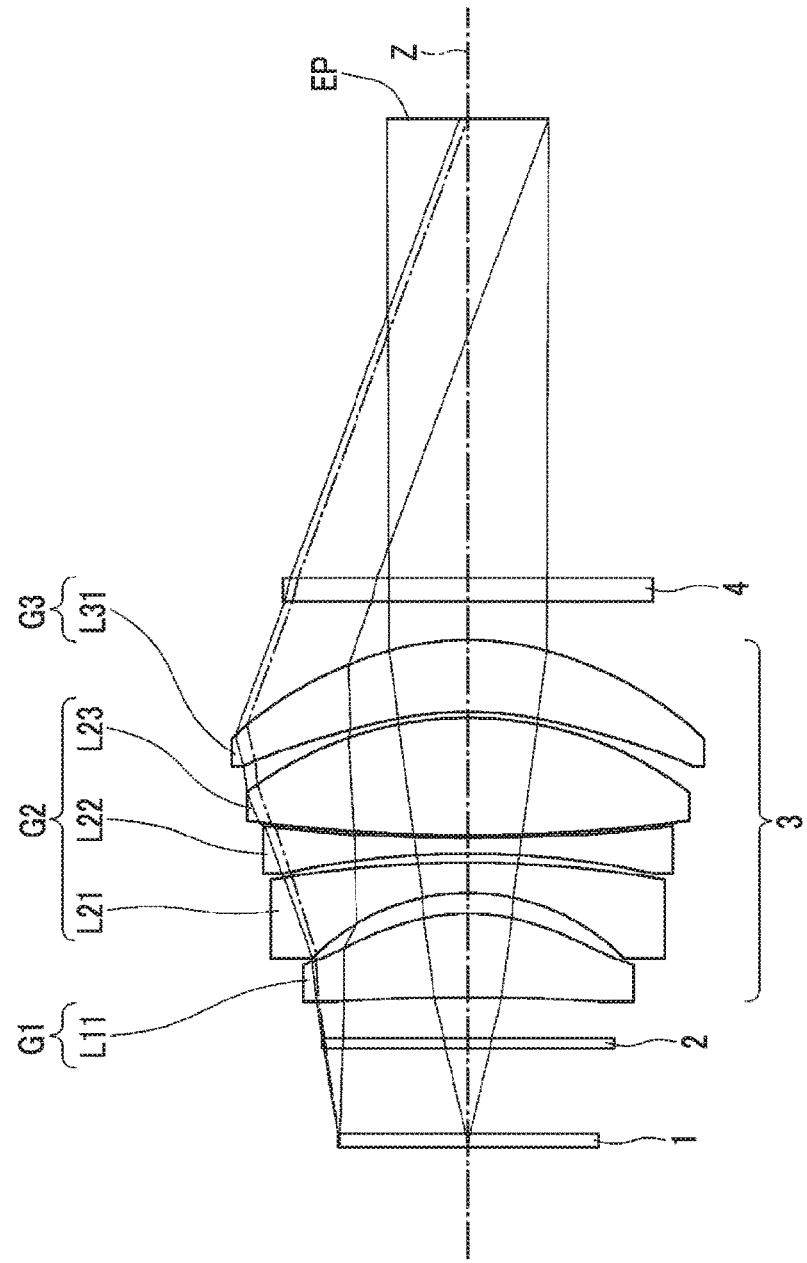
FIG. 3 is a cross-sectional view illustrating a configuration and an optical path of an ocular lens of Example 3 of the present invention.

Hereinafter, an embodiment of the present invention will be described in detail with reference to the accompanying drawings. FIG. 1 is a cross-sectional view illustrating a configuration of an ocular lens according to an embodiment of the present invention, and corresponds to Example 1 described later. Similarly, cross-sectional views of configuration examples corresponding to ocular lenses Example 2 and Example 3 which will be described later are shown in FIGS. 2 and 3, respectively. In FIG. 1 to FIG. 3, methods of illustration thereof and basic configurations are the same as each other, and thus will be described below mainly with reference to FIG. 1.

In the example shown in FIG. 1, an image display device 1 is used as an observation object, and a point on an optical axis on an image display device 1 and a light flux directed from a highest point toward an eye-point EP are shown together. The eye-point EP shown in FIG. 1 not indicates a size or a shape, but indicates a position in the direction of the optical axis. In FIG. 1, the left side is shown as an observation object side, and the right side is shown as an eye-point side. Meanwhile, in the following description, the observation object side is also referred to as an object side.

This ocular lens 3 can be used when an image displayed on the image display surface of the image display device 1 is magnified and observed. An example of the image display device 1 includes a liquid crystal display device or the like. In FIG. 1, an example is shown in which parallel plate-like optical members 2 and 4 are disposed between the image display device 1 and the ocular lens 3 and between the ocular lens 3 and the eye-point EP, respectively. The optical members 2 and 4 are assumed to be protective cover glass, various types of filters, or the like, and a configuration can also be used in which these members are excluded in the present invention.

This ocular lens 3 consists of a first lens group G1 having a positive refractive power, a second lens group G2 having a positive or negative refractive power, and a third lens group G3 having a positive refractive power which are arrayed in order from the object side to the eye-point side along an optical axis Z.

The first lens group G1 consists of one meniscus lens having a positive refractive power with the convex surface toward the eye-point side. This lens is formed to have a meniscus shape, which leads to the advantage of the correction of distortion. In addition, this lens is formed to have a meniscus shape, which leads to the advantage of a reduction in a distance (hereinafter, referred to as the entire length) on the optical axis from the image display surface of the image display device 1 to the lens surface of the ocular lens 3 closest to the eye-point side, whereby it is also contribute to a higher eye-point.

It is preferable that the first lens group G1 has at least one or more aspherical surfaces. At least one surface is formed to be an aspherical surface, and thus it is possible to make it easy to correct high-order astigmatism, spherical aberration, and distortion.

The second lens group G2 is configured to include at least one negative lens and at least one positive lens, and the number of lenses constituting the second lens group G2 is configured to be three or less. This lens group is formed to have a small number of lenses, and thus the effect of a reduction in the entire length is obtained. In addition, this lens group is formed to include the positive lens and the negative lens, and thus it is possible to correct chromatic aberration.

The third lens group G3 consists of one meniscus lens having a positive refractive power with the convex surface toward the eye-point side. this lens is formed to have a meniscus shape, and thus it is suppress the generation of spherical aberration.

It is preferable that he third lens group G3 has at least one or more aspherical surfaces. At least one surface is formed to be an aspherical surface, and thus it is possible to make it easy to correct high-order astigmatism, spherical aberration, and distortion.

In the example shown in FIG. 1, the first lens group G1 consists of a lens L11, the second lens group G2 consists of three lenses of lenses L21 to L23 in order from the object side, and the third lens group G3 consists of a lens L31. The second lens group G2 is configured to consist of three lenses, and thus it is possible to increase the absolute value of the radius of curvature of each lens, and to reduce spherical aberration. Meanwhile, the second lens group G2 may be configured to consist of two lenses as in the example shown in FIG. 2. In such a configuration, it is possible to shorten the length of the ocular lens 3 in the direction of the optical axis, that is, the length in the direction of the optical axis from the lens surface of the ocular lens 3 closest to the object side to the lens surface thereof closest to the eye-point side.

This ocular lens 3 is configured to satisfy the following Conditional Expression (1).

$$0.8 < f/TL < 1.1 \qquad (1)$$

Here, f is a focal length of the whole system, and
TL is a distance on the optical axis from a surface on the observation object side of the meniscus lens of the first lens group to a surface on the eye-point side of the meniscus lens of the third lens group.

TL of Conditional Expression (1) is the length of the aforementioned ocular lens 3 in the direction of the optical axis. The ratio value is not set to be equal to or less than the lower limit of Conditional Expression (1), and thus it is easy to secure a distance from the ocular lens 3 to the image display device 1 and a space for performing diopter adjustment. The ratio value is not set to be equal to or less than the upper limit of Conditional Expression (1), and thus it is possible to secure a distance for bending a principal light ray of an off-axis light flux, which leads to the advantage of a high eye-point.

It is preferable to satisfy the following Conditional Expression (1-1) in order to enhance the effect of Conditional Expression (1).

$$0.9 < f/TL < 1 \qquad (1\text{-}1)$$

In addition, it is preferable that this ocular lens 3 satisfies the following Conditional Expression (2).

$$0.78 < TGL/TL < 0.97 \qquad (2)$$

Here, TGL is a total sum of central thicknesses of lenses of the whole system, and
TL is a distance on the optical axis from a surface on the observation object side of the meniscus lens of the first lens group to a surface on the eye-point side of the meniscus lens of the third lens group.

The ratio value is not set to be equal to or less than the lower limit of Conditional Expression (2), and thus it is possible to narrow an air spacing between lenses, and to suppress the generation of high-order astigmatism which is a problem with a wide angle of view. The ratio value is not set to be equal to or less than the upper limit of Conditional Expression (2), and thus it is easy to correct low-order astigmatism.

It is more preferable to satisfy the following Conditional Expression (2-1) in order to enhance the effect of Conditional Expression (2).

$$0.8 < TGL/TL < 0.95 \qquad (2\text{-}1)$$

In addition, it is preferable that this ocular lens 3 satisfies the following Conditional Expression (3).

$$0.65 < (R1f - R1r)/(R1f + R1r) < 1 \qquad (3)$$

Here, R1f is a paraxial radius of curvature of a surface on the observation object side of the meniscus lens of the first lens group, and
R1r is a paraxial radius of curvature of a surface on the eye-point side of the meniscus lens of the first lens group.

Conditional Expression (3) specifies the shape factor of the meniscus lens of the first lens group G1. The ratio value is not set to be equal to or less than the lower limit of Conditional Expression (3), which leads to the advantage of the correction of astigmatism. The ratio value is not set to be equal to or less than the upper limit of Conditional Expression (3), which leads to the advantage of a reduction in the entire length and a high eye-point.

It is more preferable to satisfy the following Conditional Expression (3-1) in order to enhance the effect of Conditional Expression (3).

$$0.7 < (R1f - R1r)/(R1f + R1r) < 0.95 \qquad (3\text{-}1)$$

In addition, it is preferable that this ocular lens 3 satisfies the following Conditional Expression (4).

$$0.01 < (R3f - R3r)/(R3f + R3r) < 0.3 \qquad (4)$$

Here, R3f is a paraxial radius of curvature of a surface on the observation object side of the meniscus lens of the third lens group, and
R3r is a paraxial radius of curvature of a surface on the eye-point side of the meniscus lens of the third lens group.

Conditional Expression (4) specifies the shape factor of the meniscus lens of the third lens group G3. The ratio value is not set to be equal to or less than the lower limit of Conditional Expression (4), which leads to the advantage of the correction of astigmatism, whereby it is possible to suppress the generation of spherical aberration. The ratio value is not set to be equal to or less than the upper limit of Conditional Expression (4), which leads to the advantage of a reduction in the entire length and a high eye-point.

It is more preferable to satisfy the following Conditional Expression (4-1) in order to enhance the effect of Conditional Expression (4).

$$0.05 < (R3f - R3r)/(R3f + R3r) < 0.25 \qquad (4\text{-}1)$$

In addition, it is preferable that this ocular lens 3 satisfies the following Conditional Expression (5).

$$1.75 < Npave < 2 \qquad (5)$$

Here, Npave is an average value of refractive indices in a d line of positive lenses of the whole system.

The average value of refractive indices of the positive lenses included in the ocular lens 3 is not set to be equal to or less than the lower limit of Conditional Expression (5), and thus it is possible to set the Petzval sum to a suitable value, and to suppress a field curvature. The average value is not set to be equal to or less than the upper limit of Conditional Expression (5), and thus it is possible to select a material having an appropriate Abbe number, which leads to the facilitation of the correction of chromatic aberration.

It is more preferable to satisfy the following Conditional Expression (5-1) in order to enhance the effect of Conditional Expression (5).

$$1.8 < Npave < 1.95 \qquad (5\text{-}1)$$

In addition, it is preferable that this ocular lens 3 satisfies the following Conditional Expression (6).

$$0.01 < Nmax - Nmin < 0.35 \qquad (6)$$

Nmax is a maximum value of refractive indices in the d line of lenses of the whole system, and Nmin is a minimum value of refractive indices in the d line of the lenses of the whole system.

The refractive index difference between all the lenses including the positive lens and the negative lens included in the ocular lens 3 is not set to be equal to or less than the lower limit of Conditional Expression (6), and thus it is possible to select a material having an appropriate Abbe number, which leads to the facilitation of the correction of chromatic aberration. The refractive index difference is not set to be equal to or less than the upper limit of Conditional Expression (6), which leads to the advantage of a reduction in the thickness of a lens system.

It is more preferable to satisfy the following Conditional Expression (6-1) in order to enhance the effect of Conditional Expression (6).

$$0.05 < N\text{max} - N\text{min} < 0.3 \quad (6\text{-}1)$$

The above-mentioned preferred configurations and available configurations can be arbitrarily combined, and it is preferable that the configurations are appropriately selectively adopted in accordance with requested specification. According to the present embodiment, it is possible to realize an ocular lens having a high eye-point, a wide apparent field of view, and satisfactory optical performance. Meanwhile, the term "high eye-point" as used herein means that a distance (hereinafter, referred to as an eye relief) on the optical axis from a lens surface closest to the eye-point side to the eye-point EP at an air conversion length is longer than 21 mm in a state where the diopter scale is −1 diopter. In addition, the "wide apparent field of view" means that the apparent field of view is greater than 40°.

Next, numerical value examples of the ocular lens of the present invention will be described.

EXAMPLE 1

A lens configuration and an optical path of an ocular lens of Example 1 are shown in FIG. 1, and a method of illustration thereof and the configuration thereof are as described, as the example shown in FIG. 1. Therefore, the repeated description thereof will be partially omitted herein. The ocular lens of Example 1 consists of a first lens group G1 having a positive refractive power, a second lens group G2 having a positive refractive power, and a third lens group G3 having a positive refractive power, in order from the object side. The second lens group G2 consists of a meniscus-shaped lens L21 having a negative refractive power with the convex surface toward the eye-point side and two meniscus-shaped lenses L22 and L23 having a positive refractive power with the convex surface toward the eye-point side, in order from the object side.

Table 1 shows basic lens data of the ocular lens of Example 1, Table 2 shows specifications, and Table 3 shows aspherical coefficients. The image display device 1 and the optical members 2 and 4 are also inclusively shown in Table 1. The column of Si in Table 1 indicates an i-th (i=0, 1, 2, 3, ...) surface number in a case where surface numbers are assigned to the respective surfaces of components so as to sequentially increase toward the eye-point side with the surface of the image display device 1 on the object side set to a first surface, the column of Ri indicates a radius of curvature of the i-th surface, and the column of Di indicates a surface spacing on the optical axis Z between the i-th surface and an (i+1)-th surface. The column of Ndj in Table 1 indicates a refractive index of a j-th (j=1, 2, 3, ...) component relating to the d line (wavelength of 587.6 nm), where j sequentially increases toward the eye-point side with a component closest to the object side set to a first component, and the column of vdj indicates an Abbe number relating to the d line of the j-th component from the object side.

The sign of the radius of curvature is set to be positive with respect to a surface shape with the convex surface toward the object side, and is set to be negative with respect to a surface shape with the convex surface toward the eye-point side. In Table 1, a surface number and a term of (EP) are written in the place of the surface number of a surface equivalent to the eye-point EP.

Table 2 shows values of the focal length f of the whole system, the apparent field of view 2ω, the eye relief at the air conversion length, on the basis of the d line. [°] in the place of 2ω means that the unit thereof is a degree. The values shown in Table 2 correspond to a case where the diopter scale is −1 diopter. Meanwhile, the ocular lens of Example 1 is configured such that the adjustment of the diopter scale in a range of −4 diopter to +2 diopter can be performed by integrally moving the entire lens system in the direction of the optical axis.

In Table 1, mark * is attached to the surface number of an aspherical surface, and the numerical values of a paraxial radius of curvature are written in the column of the radius of curvature of the aspherical surface. Table 3 shows an aspherical coefficient of each aspherical surface of Example 1. "E±n" (n is an integer) of the numerical value of the aspherical coefficient of Table 3 means "×10$^{±n}$". The aspherical coefficient is a value of each of coefficients KA and Am (m=3, 4, 5, ...) in an aspherical expression represented by the following expression.

$$Zd = \frac{C \times h^2}{1 + \sqrt{1 - KA \times C^2 \times h^2}} + \sum_m Am \times h^m$$

Here, Zd is an aspherical depth (length of a vertical line drawn from a point on an aspherical surface having a height h down to a plane perpendicular to the optical axis with which the vertex of the aspherical surface is in contact), h is a height (distance from the optical axis to a lens surface), C is a paraxial curvature, and KA and Am are aspherical coefficients.

In data of each table, a degree is used as a unit of an angle, and mm is used as a unit of a length. In addition, the following each table describes numerical values rounded off to predetermined decimal places.

TABLE 1

| EXAMPLE 1 | | | | |
|---|---|---|---|---|
| Si | Ri | Di | Ndj | vdj |
| 1 | ∞ | 0.7000 | 1.51680 | 64.20 |
| 2 | ∞ | 4.3000 | | |
| 3 | ∞ | 0.5000 | 1.49023 | 57.49 |
| 4 | ∞ | 1.6700 | | |
| *5 | −210.5311 | 3.7600 | 1.85023 | 40.10 |
| *6 | −12.8191 | 1.9700 | | |
| 7 | −9.7952 | 0.9000 | 1.95906 | 17.47 |
| 8 | −64.3622 | 0.1500 | | |
| 9 | −54.3794 | 2.4200 | 1.95375 | 32.32 |
| 10 | −27.7591 | 0.1000 | | |
| 11 | −114.5070 | 5.8300 | 1.88100 | 40.14 |
| 12 | −16.7834 | 0.1000 | | |
| *13 | −31.4905 | 3.0400 | 1.85023 | 40.10 |

TABLE 1-continued

EXAMPLE 1

| Si | Ri | Di | Ndj | vdj |
|---|---|---|---|---|
| *14 | −21.3347 | 1.5300 | | |
| 15 | ∞ | 1.2000 | 1.51680 | 64.20 |
| 16 | ∞ | 23.0000 | | |
| 17(EP) | ∞ | | | |

TABLE 2

EXAMPLE 1

| | |
|---|---|
| f | 17.22 |
| 2ω[°] | 40.4 |
| EYE RELIEF | 25.32 |

TABLE 3

EXAMPLE 1

| SURFACE NUMBER | 5 | 6 | 13 | 14 |
|---|---|---|---|---|
| KA | 1.8808762E+02 | 1.5264437E+00 | −1.3962273E+00 | −3.0891140E+00 |
| A3 | 0.0000000E+00 | 0.0000000E+00 | 0.0000000E+00 | 0.0000000E+00 |
| A4 | −1.3054716E−03 | −6.9001382E−04 | −2.0254941E−04 | −2.1330390E−04 |
| A5 | 5.9812109E−04 | 4.4872411E−04 | 2.3775663E−05 | 4.5885372E−05 |
| A6 | 1.4011387E−06 | −1.3517147E−04 | 2.8834248E−05 | 7.1252053E−06 |
| A7 | −1.0978643E−04 | 2.2104101E−05 | −6.4708753E−06 | −1.9792862E−06 |
| A8 | 5.0448964E−05 | −1.1235421E−06 | −9.3856184E−08 | 4.8283502E−07 |
| A9 | −1.1918700E−05 | 1.2429093E−07 | 1.8743377E−07 | −2.9628085E−07 |
| A10 | 2.0393057E−06 | −1.0123658E−07 | −2.6725193E−08 | 8.5217739E−08 |
| A11 | −3.8929080E−07 | 1.9900956E−08 | 1.6896370E−09 | −1.1458939E−08 |
| A12 | 8.2521157E−08 | −1.8696891E−09 | −1.3470699E−11 | 6.3512527E−10 |
| A13 | −1.3218710E−08 | 2.4809478E−10 | −1.1410960E−11 | 1.3415704E−11 |
| A14 | 1.3219280E−09 | −4.2766155E−11 | 1.5721213E−12 | −3.6412033E−12 |
| A15 | −7.3446362E−11 | 3.7449516E−12 | −9.4898499E−14 | 1.7549968E−13 |
| A16 | 1.7401987E−12 | −1.1901370E−13 | 2.1760689E−15 | −2.8412542E−15 |

Figure 4:
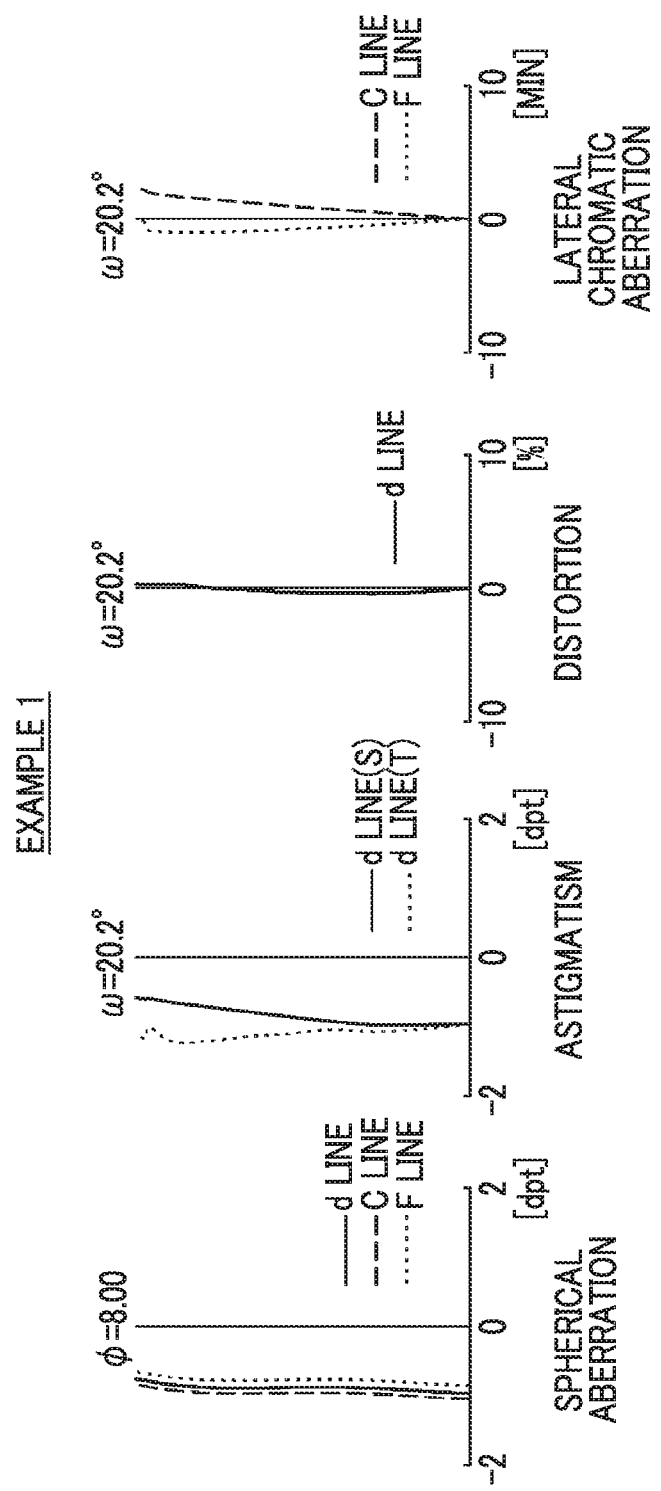
FIG. 4 is a diagram of aberrations of the ocular lens of Example 1 of the present invention.

FIG. 4 shows a diagram of aberrations of the ocular lens of Example 1. FIG. 4 shows spherical aberration, astigmatism, distortion (distortion aberration), and lateral chromatic aberration (chromatic aberration of magnification), in order from the left side. In the spherical aberration diagram, aberrations relating to a d line (wavelength of 587.6 nm), a C line (wavelength of 656.3 nm), and an F line (wavelength of 486.1 nm) are indicated by a solid line, a long dashed line, and a short dashed line, respectively. In the astigmatism diagram, aberrations relating to the d line in a sagittal direction and a tangential direction are indicated by a solid line and a short dashed line, respectively. In the distortion diagram, aberration relating to the d line is indicated by a solid line. In the lateral chromatic aberration diagram, aberrations relating to the C line and the F line are indicated by a long dashed line and a short dashed line, respectively. The unit of the horizontal axis in the spherical aberration diagram and the astigmatism diagram is a diopter. In addition, φ in the spherical aberration diagram means a diameter of the eye-point in a case where the unit is set to mm, and ω in the other aberration diagrams means half the angle of the apparent field of view.

Symbols, meanings, and description methods of the respective pieces of data relating to Example 1 are the same as those in the following examples unless otherwise noted, and thus the repeated description thereof will be omitted below.

EXAMPLE 2

A lens configuration and an optical path of an ocular lens of Example 2 are shown in FIG. 2. The ocular lens of Example 2 consists of a first lens group G1 having a positive refractive power, a second lens group G2 having a negative refractive power, and a third lens group G3 having a positive refractive power, in order from the object side. the second lens group G2 consists of a meniscus-shaped lens L21 having a negative refractive power with the convex surface toward the eye-point side and a meniscus-shaped lens L22 having a positive refractive power with the convex surface toward the eye-point side, in order from the object side.

Figure 5:
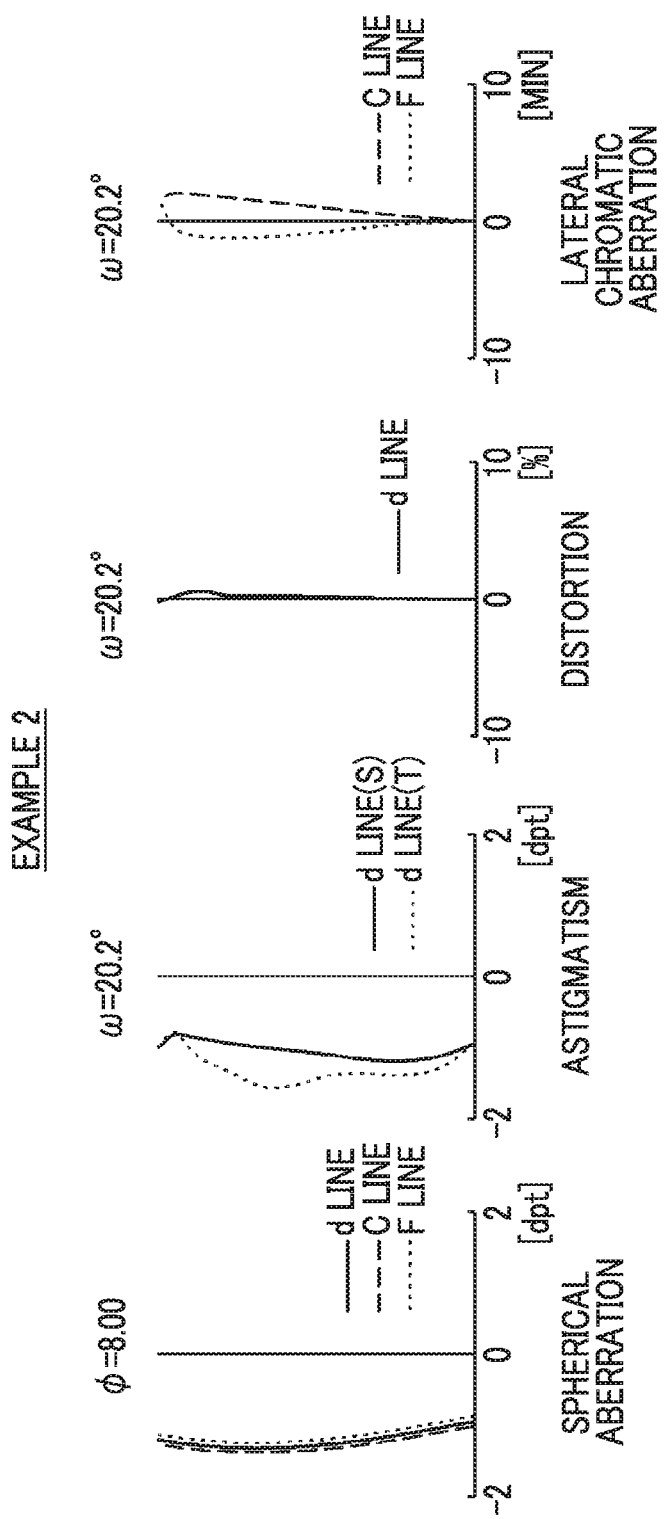
FIG. 5 is a diagram of aberrations of the ocular lens of Example 2 of the present invention.

Table 4 shows basic lens data of the ocular lens of Example 2, Table 5 shows specifications, Table 6 shows aspherical coefficients, and FIG. 5 shows a diagram of aberrations. The values shown in Table 5 correspond to a case where the diopter scale is −1 diopter, and the ocular lens of Example 2 is configured such that the adjustment of the diopter scale in a range of −4 diopter to +2 diopter can be performed by integrally moving the entire lens system in the direction of the optical axis.

TABLE 4

EXAMPLE 2

| Si | Ri | Di | Ndj | vdj |
|---|---|---|---|---|
| 1 | ∞ | 0.7000 | 1.51680 | 64.20 |
| 2 | ∞ | 4.3000 | | |
| 3 | ∞ | 0.5000 | 1.49023 | 57.49 |
| 4 | ∞ | 1.8167 | | |
| *5 | −55.1742 | 5.2126 | 1.75501 | 51.16 |
| *6 | −6.8520 | 1.1832 | | |
| 7 | −10.2543 | 1.3934 | 1.95906 | 17.47 |
| 8 | −35.7978 | 0.7201 | | |
| 9 | −23.8547 | 3.6223 | 2.00330 | 28.27 |
| 10 | −19.0109 | 0.2417 | | |
| *11 | −15.7558 | 5.9457 | 1.77377 | 47.17 |
| *12 | −12.5039 | 1.8049 | | |
| 13 | ∞ | 1.2000 | 1.51680 | 64.20 |
| 14 | ∞ | 22.0000 | | |
| 15(EP) | ∞ | | | |

TABLE 5

EXAMPLE 2

| | |
|---|---|
| f | 17.15 |
| 2ω[°] | 40.5 |
| EYE RELIEF | 24.60 |

TABLE 6

EXAMPLE 2

| SURFACE NUMBER | 5 | 6 | 11 | 12 |
|---|---|---|---|---|
| KA | 0.0000000E+00 | 0.0000000E+00 | 0.0000000E+00 | 0.0000000E+00 |
| A3 | 4.3375952E−03 | 4.1036504E−03 | 2.3056700E−03 | 6.4758749E−04 |
| A4 | −7.0383010E−04 | −1.8808019E−04 | 1.0979667E−04 | 4.6879007E−06 |
| A5 | 8.0097155E−06 | −2.1618001E−05 | −4.4865053E−06 | 1.7216174E−06 |
| A6 | 4.6901039E−06 | 3.3720062E−06 | −4.9639408E−07 | −1.3775872E−07 |
| A7 | 1.9821059E−07 | 2.8686737E−07 | −3.2944914E−08 | −1.8341242E−08 |
| A8 | 1.3822748E−08 | −3.4195433E−09 | −4.7391820E−10 | −3.3316899E−10 |
| A9 | −2.7480811E−09 | −3.1186076E−09 | 1.7643251E−11 | −1.7102337E−11 |
| A10 | −4.1064813E−10 | −4.5822892E−10 | 9.0991116E−12 | 2.4863308E−12 |
| A11 | −2.7512273E−12 | 3.0628931E−12 | 7.4528540E−13 | 1.8131002E−13 |
| A12 | −1.7261572E−12 | 2.4989870E−12 | 7.0968046E−14 | 1.0890933E−14 |
| A13 | −7.0500673E−14 | 4.7546368E−13 | 4.6564267E−15 | 6.0265626E−16 |
| A14 | 4.2372260E−15 | 4.0923218E−14 | 1.3447170E−16 | 7.3304019E−17 |
| A15 | −1.4614083E−15 | 1.1551851E−15 | 2.2454263E−18 | 5.7581471E−18 |
| A16 | 6.8919897E−16 | −1.8008993E−15 | −1.0122925E−18 | 9.9309827E−19 |
| A17 | −8.4838124E−17 | −6.9277396E−17 | −1.5288772E−19 | 8.4256053E−20 |
| A18 | −1.0870412E−17 | −3.6505622E−18 | −1.3192186E−20 | 3.5169008E−21 |
| A19 | −2.3434899E−19 | 2.5268603E−19 | −5.9805412E−22 | −2.9396086E−22 |
| A20 | 3.1083545E−19 | 2.3844022E−19 | 4.0260379E−23 | −8.1383952E−23 |

EXAMPLE 3

A lens configuration and an optical path of an ocular lens of Example 3 are shown in FIG. 3. The ocular lens of Example 3 consists of a first lens group G1 having a positive refractive power, a second lens group G2 having a negative refractive power, and a third lens group G3 having a positive refractive power, in order from the object side. The second lens group G2 consists of a meniscus-shaped lens L21 having a negative refractive power with the convex surface toward the eye-point side, a biconcave lens L22, and a biconvex lens L23, in order from the object side.

Figure 6:
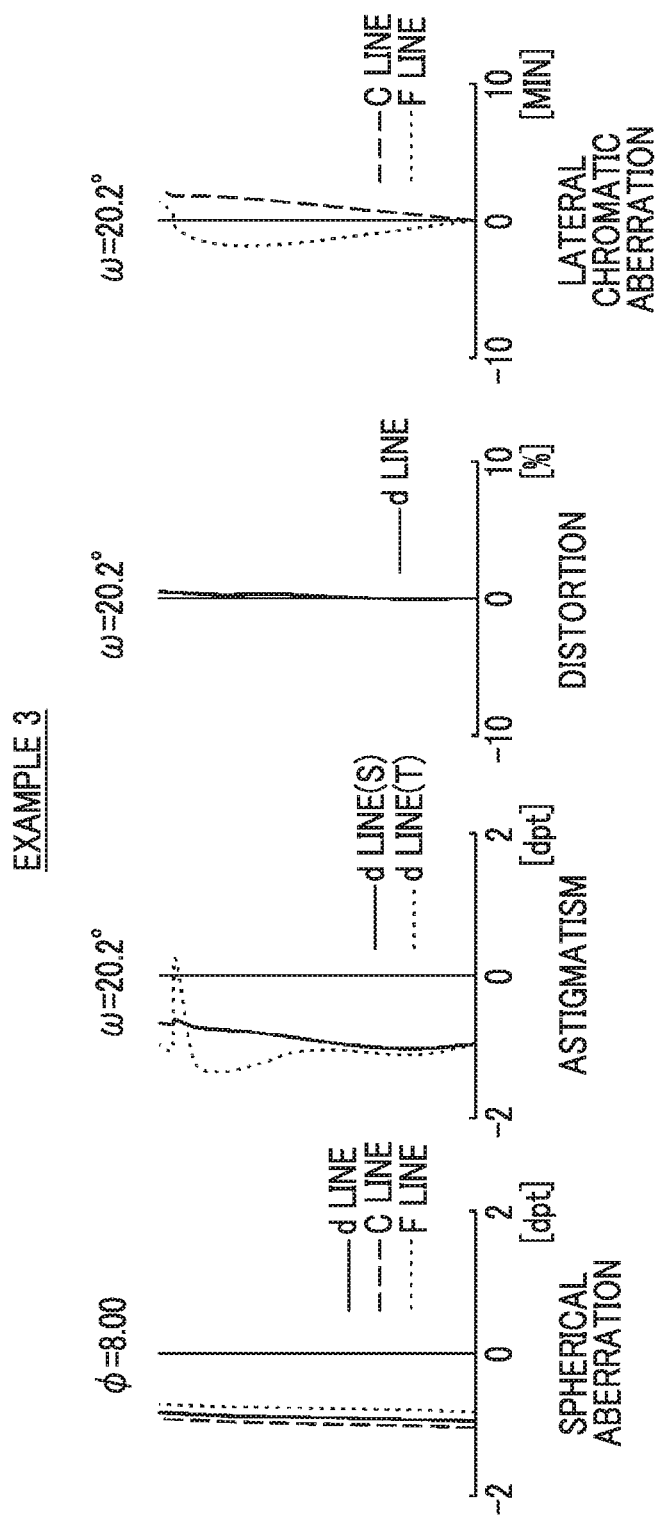
FIG. 6 is a diagram of aberrations of the ocular lens of Example 3 of the present invention.

Table 7 shows basic lens data of the ocular lens of Example 3, Table 8 shows specifications, Table 9 shows aspherical coefficients, and FIG. 6 shows a diagram of aberrations. The values shown in Table 8 correspond to a case where the diopter scale is −1 diopter, and the ocular lens of Example 3 is configured such that the adjustment of the diopter scale in a range of −4 diopter to +2 diopter can be performed by integrally moving the entire lens system in the direction of the optical axis.

TABLE 7

EXAMPLE 3

| Si | Ri | Di | Ndj | νdj |
|---|---|---|---|---|
| 1 | ∞ | 0.7000 | 1.51680 | 64.20 |
| 2 | ∞ | 4.3000 | | |

TABLE 7-continued

EXAMPLE 3

| Si | Ri | Di | Ndj | νdj |
|---|---|---|---|---|
| 3 | ∞ | 0.5000 | 1.49023 | 57.49 |
| 4 | ∞ | 2.0373 | | |

TABLE 7-continued

EXAMPLE 3

| Si | Ri | Di | Ndj | νdj |
|---|---|---|---|---|
| *5 | −58.7897 | 4.2013 | 1.84999 | 43.00 |
| *6 | −9.1990 | 1.0197 | | |
| 7 | −10.8053 | 1.5099 | 1.73223 | 28.39 |
| 8 | −57.5588 | 0.4573 | | |
| 9 | −43.4569 | 0.8000 | 1.98734 | 15.63 |
| 10 | 85.3993 | 0.1499 | | |
| 11 | 82.6819 | 5.8783 | 1.84999 | 43.00 |
| 12 | −18.1231 | 0.3000 | | |
| *13 | −16.4341 | 3.5992 | 1.91760 | 36.24 |
| *14 | −13.8163 | 1.9061 | | |
| 15 | ∞ | 1.2000 | 1.51680 | 64.20 |
| 16 | ∞ | 23.0000 | | |
| 17(EP) | ∞ | | | |

TABLE 8

EXAMPLE 3

| | |
|---|---|
| f | 17.23 |
| 2ω[°] | 40.4 |
| EYE RELIEF | 25.70 |

TABLE 9

EXAMPLE 3

| SURFACE NUMBER | 5 | 6 | 13 | 14 |
|---|---|---|---|---|
| KA | 0.0000000E+00 | 0.0000000E+00 | 0.0000000E+00 | 0.0000000E+00 |
| A3 | 1.6921421E−03 | 1.7661126E−03 | 3.8733578E−04 | 6.0207623E−05 |
| A4 | −1.0151114E−04 | −3.9268835E−05 | 6.1685915E−05 | 1.2534842E−05 |
| A5 | −1.6533572E−05 | −1.0793023E−05 | 9.0266762E−07 | 1.4217171E−06 |
| A6 | −9.1333472E−07 | 1.2882935E−07 | −5.8200465E−08 | −3.7992838E−11 |
| A7 | 1.3379196E−08 | 1.0530298E−07 | −7.1220029E−09 | −6.5126319E−09 |
| A8 | 1.1932930E−08 | 9.2385991E−09 | −5.8032573E−10 | −7.3882081E−10 |
| A9 | 2.0580012E−09 | 8.7817014E−11 | −5.4026655E−11 | −4.4725302E−11 |
| A10 | 2.4441549E−10 | −7.1033556E−11 | −3.4412036E−12 | −2.3147311E−12 |
| A11 | 2.4604269E−11 | −4.7260800E−12 | −2.1277977E−13 | −5.8082747E−14 |
| A12 | 1.8254643E−12 | 1.8672731E−13 | −8.9554411E−15 | 3.6835545E−15 |
| A13 | 6.8516154E−14 | 1.8818463E−13 | 1.7158129E−16 | 7.3779337E−16 |
| A14 | −7.6801759E−15 | 3.8746680E−14 | 1.0722735E−16 | 8.0989168E−17 |
| A15 | −2.4759310E−15 | 5.5920667E−15 | 1.3499906E−17 | 5.4966147E−18 |
| A16 | −4.3417840E−16 | 6.2414456E−16 | 1.4688405E−18 | 2.2220389E−19 |
| A17 | −5.1657443E−17 | 5.4706846E−17 | 1.1042048E−19 | −1.2145415E−21 |
| A18 | −4.5763756E−18 | −3.1103611E−19 | 5.4420668E−21 | −1.2681736E−21 |
| A19 | −4.3501876E−19 | −1.1004120E−18 | −1.9778004E−22 | −2.1320381E−23 |
| A20 | −2.9201065E−20 | −2.8857071E−19 | −1.2999362E−22 | −1.2514309E−23 |

Table 10 shows values corresponding to Conditional Expressions (1) to (6) of the ocular lenses of Examples 1 to 3. The values shown in Table 10 are based on the d line.

TABLE 10

| EXPRESSION NUMBER | | EXAMPLE 1 | EXAMPLE 2 | EXAMPLE 3 |
|---|---|---|---|---|
| (1) | f/TL | 0.943 | 0.936 | 0.962 |
| (2) | TGL/TL | 0.87 | 0.88 | 0.89 |
| (3) | (R1f − R1r)/(R1f + R1r) | 0.89 | 0.78 | 0.73 |
| (4) | (R3f − R3r)/(R3f + R3r) | 0.19 | 0.12 | 0.09 |
| (5) | Npave | 1.88380 | 1.84403 | 1.87253 |
| (6) | Nmax − Nmin | 0.10883 | 0.24829 | 0.25511 |

As can be seen from the above-mentioned data, the ocular lenses of Examples 1 to 3 is configured such that the eye relief is a high eye-point equal to or greater than 24 mm in a state where the diopter scale is −1 diopter, the apparent field of view has a sufficient width equal to or greater than 40°, and that high optical performance is realized by satisfactory correction of various aberrations.

Figure 7:
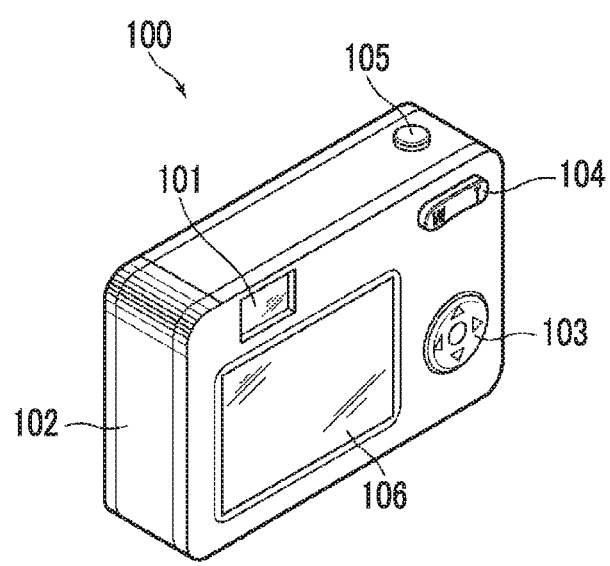
FIG. 7 is a perspective view of the rear surface side of an imaging apparatus according to an embodiment of the present invention.

Next, an imaging apparatus according to an embodiment of the present invention will be described. FIG. 7 is a perspective view illustrating a schematic configuration of the rear surface side of a camera 100 according to an embodiment of the imaging apparatus of the present invention. The camera 100 includes a viewfinder 101 on the upper portion of a camera body 102. The viewfinder 101 has the ocular lens according to an embodiment of the present invention. In addition, the camera 100 includes an operation button 103 for performing various settings on the rear surface of the camera body 102, a zoom lever 104 for performing zooming, and a monitor 106 for displaying an image or various setting screens, and includes a shutter button 105 on the upper surface of the camera body 102. In the camera 100, a subject image of an imaging lens (not shown) disposed on the front surface of the camera body 102 is formed on the imaging surface of an imaging device (not shown). A user views the viewfinder 101 from the rear surface side and observes the viewfinder image of a subject. Meanwhile, FIG. 7 shows an example of the viewfinder built into the camera 100, but the present invention can also be applied to an external viewfinder. In addition, the imaging apparatus of the present invention is not limited to the example shown in FIG. 7. For example, the present invention can also be applied to a video camera or the like.

Hereinbefore, the present invention has been described through embodiments and examples, but the present invention is not limited to the above-described embodiments and examples, and can be variously modified. For example, the radius of curvature, the surface spacing, the refractive index, the Abbe number, and the aspherical coefficient of each lens are not limited to the values shown in each of the numerical value examples, and other values can be used therefor.

What is claimed is:

1. An ocular lens consisting of, in order from an observation object side to an eye-point side:
    a first lens group having a positive refractive power;
    a second lens group having a positive or negative refractive power; and
    a third lens group having a positive refractive power,
    wherein the first lens group consists of one meniscus lens having a positive refractive power with a convex surface toward the eye-point side,
    the second lens group includes at least one negative lens and at least one positive lens, and the number of lenses constituting the second lens group is three or less,
    the third lens group consists of one meniscus lens having a positive refractive power with a convex surface toward the eye-point side, and
    the following Conditional Expression (1) is satisfied, $$0.8 < f/TL < 1.1 \quad (1)$$

where f is a focal length of the whole system, and

TL is a distance on an optical axis from a surface on the observation object side of the meniscus lens of the first lens group to a surface on the eye-point side of the meniscus lens of the third lens group.

2. The ocular lens according to claim 1, wherein the following Conditional Expression (2) is satisfied, $$0.78 < TGL/TL < 0.97 \tag{2}$$

where TGL is a total sum of central thicknesses of lenses of the whole system.

3. The ocular lens according to claim 1, wherein the following Conditional Expression (3) is satisfied, $$0.65 < (R1f - R1r)/(R1f + R1r) < 1 \tag{3}$$

where $R1f$ is a paraxial radius of curvature of a surface on the observation object side of the meniscus lens of the first lens group, and $R1r$ is a paraxial radius of curvature of a surface on the eye-point side of the meniscus lens of the first lens group.

4. The ocular lens according to claim 1, wherein the following Conditional Expression (4) is satisfied, $$0.01 < (R3f - R3r)/(R3f + R3r) < 0.3 \tag{4}$$

where $R3f$ is a paraxial radius of curvature of a surface on the observation object side of the meniscus lens of the third lens group, and $R3r$ is a paraxial radius of curvature of a surface on the eye-point side of the meniscus lens of the third lens group.

5. The ocular lens according to claim 1, wherein the following Conditional Expression (5) is satisfied, $$1.75 < Npave < 2 \tag{5}$$

where Npave is an average value of refractive indices in a d line of positive lenses of the whole system.

6. The ocular lens according to claim 1, wherein the following Conditional Expression (6) is satisfied, $$0.01 < Nmax - Nmin < 0.35 \tag{6}$$

where Nmax is a maximum value of refractive indices in the d line of lenses of the whole system, and Nmin is a minimum value of refractive indices in the d line of the lenses of the whole system.

7. The ocular lens according to claim 1, wherein the second lens group consists of three lenses.

8. The ocular lens according to claim 1, wherein the second lens group consists of two lenses.

9. The ocular lens according to claim 1, wherein the following Conditional Expression (1-1) is satisfied $$0.9 < f/TL < 1 \tag{1-1}$$

10. The ocular lens according to claim 2, wherein the following Conditional Expression (2-1) is satisfied $$0.8 < TGL/TL < 0.95 \tag{2-1}$$

11. The ocular lens according to claim 3, wherein the following Conditional Expression (3-1) is satisfied $$0.7 < (R1f - R1r)/(R1f + R1r) < 0.95 \tag{3-1}$$

12. The ocular lens according to claim 4, wherein the following Conditional Expression (4-1) is satisfied $$0.05 < (R3f - R3r)/(R3f + R3r) < 0.25 \tag{4-1}$$

13. The ocular lens according to claim 5, wherein the following Conditional Expression (5-1) is satisfied $$1.8 < Npave < 1.95 \tag{5-1}$$

14. The ocular lens according to claim 6, wherein the following Conditional Expression (6-1) is satisfied $$0.05 < Nmax - Nmin < 0.3 \tag{6-1}$$

15. An imaging apparatus comprising the ocular lens according to claim 1.

\* \* \* \* \*